Patented June 10, 1952

2,600,122

UNITED STATES PATENT OFFICE 2,600,122

PROCESS OF FORMING PLASTISOLS

Albert W. Meyer, Nutley, and William A. Hermonat, Passaic, N. J., assignors to United States Rubber Company, New York, N. Y., a corporation of New Jersey No Drawing. Application June 4, 1949,
Serial No. 97,316

6 Claims. (Cl. 260—34.2)

1

The invention consists in a method of making a fluid plastisol by mixing a plasticizer with (A) a thermoplastic resin powder and (B) a second thermoplastic resin powder of substantialy different particle size.

The term "plastisol" is well known in the art and has reference to a fluid or pasty mixture or suspension of a resin in particulate form with a plasticizer which is a poor solvent for the resin at ordinary temperatures, but which is capable of dissolving the resin particles at elevated temperatures, forming a gel structure. Plastisols afford a convenient and economical means of fabricating molded or coated articles, etc., from thermoplastic resins. For instance, to make a shaped article, a mold of the desired shape is simply charged with plastisol, heated to cause the plastisol to gel, and then cooled, whereupon the plastisol becomes rigid; the article retains the desired shape after removal from the mold.

For certain purposes, e. g., for charging molds or for coating cloth, it is desirable to employ smooth, fluid plastisols which will flow rapidly, in order to increase the speed and convenience of the fabricating operation, as well as to improve the quality of the fabricated article. Certain thermoplastic resin powders normally form highly viscous plastisols unsuited to such uses. The object of the present invention is to provide a method whereby such resin powders may be made to form smooth, fluid plastisols of relatively low viscosity.

We have surprisingly found that a fluid plastisol can be made from thermoplastic resin powder (A) which normally gives a highly viscous plastisol, by mixing such resin powder with another thermoplastic resin powder (B) of substantially different particle size.

The invention can be applied particularly advantageously to any thermoplastic resin powders which normally form highly viscous plastisols, with a 50:50 resin plasticizer mixture, having viscosities of at least about 40,000 centipoises at 25° C. Usually, in such powders, 95% of the material is within ±0.05 micron of the means particle size. Types of resins which may be employed include those made by polymerizing or copolymerizing vinyl chloride, vinyl acetate, vinyl butyrate, vinylidine chloride, styrene, dichlorostyrene, alpha-methylstyrene, ethyl acrylate, methyl methacrylate, etc., as well as polyvinyl alcohol, polyvinyl acetals, etc., including mixtures of the foregoing.

Although thermoplastic resin powders having average particle sizes in a wide range, e. g., from

2

0.05 to 200 microns, may be employed in this invention, it is preferred to employ those powders having an average particle size between 0.05 and 30 microns. Smaller particles (i. e., those having an average size less than 0.05 micron) tend to solvate rapidly in the plasticizer, thus causing relatively rapid gelation of the plastisol and a correspondingly shorter time during which it may stand prior to use. Larger particles (i. e., those having an average size greater than 30 microns) tend to result in grainy or sandy plastisols.

The amount of each of the resin powders of substantially different particle sizes which are mixed with the plasticizer may be from about 10 to 90% by volume of the resin powder mixture, depending on the particular viscosity desired in the plastisol, and on the particular resin powders and the type and quantity of plasticizer employed. The preferred volume ratio of the two powders in the mixture will generally be within the range of 75:25 to 25:75, and a 50:50 mixture (by volume) of the two resin powders generally results in a plastisol of minimum viscosity.

The ratio of the average particle sizes of the selected resin powders which are to be mixed together in the manner of this invention will vary widely depending on the desired degree of reduction of viscosity, and other variables, such as the proportions and kinds of the resin powders and plasticizer selected and the uniformity of particle size of the individual resin powders. In general, a ratio of average particle sizes of the resin powders of from 1:1.5 to 1:300, will be found to be suitable for most purposes, but other ratios may be used if desired.

As is well known, the plasticizers suitable for forming plastisols are those which will not dissolve the resin powder readily at ordinary temperatures, but which will dissolve the resin at elevated temperatures, forming a solid gel on cooling. Examples of such plasticizers are 2-ethylhexyl phthalate, tricresyl phosphate, dibutyl phthalate, and other high-boiling esters, ethers, ketones, and other known plasticizers. If desired, mixtures of plasticizers may be employed.

The amount of plasticizer in the plastisol may vary widely, e. g., from 20 to 80% of the total weight of the plastisol. For each specific resin-plasticizer combination there will generally be a concentration of plasticizer, below which the viscosity of the plastisol greatly increases.

In carrying out the invention any known method of mixing or any order of mixing may be used. The resin powders may be mixed together and then mixed with the plasticizer, or the individual powders may be mixed with plasticizer to form separate plastisols which may then be blended. If desired, one of the powders may be mixed with the plasticizer, and the second powder may be mixed with the resulting plastisol. In some cases latices containing different average resin particle sizes may be intermixed, the mixture of different sized polymers separated, dried, and mixed with plasticizer to form the plastisol.

In some cases it may be desirable to use two or more chemically different powders, e. g., one of the powders may be polyvinyl chloride, and the other powder may be another resin such as polyvinyl acetate.

Stabilizers, fillers, pigments and other modifying ingredients may be used if desired.

The fluid plastisols made by the method of this invention usually have a viscosity of less than 25,000 centipoises at 25° C. and are adapted to fabrication methods which could not be employed with high viscosity plastisols. For example, in the coating of cloth, the plastisols of this invention flow readily and can be spread uniformly over the surface of the cloth by a doctor blade while the cloth moves past the plastisol applicator at high speed, e. g., 30 feet per minute.

A preferred form of the invention contemplates employing a polyvinyl chloride resin powder which normally forms a plastisol having a viscosity of 40,000 centipoises or more (e. g., 40,000 to 100,000 centipoises) at 25° C. when mixed with an equal weight of 2-ethylhexyl phthalate. Such a powder may be mixed according to the invention with another polyvinyl chloride resin powder of substantially different particle size which similarly normally forms a plastisol having a viscosity of 40,000 centipoises or more at 25° C. when mixed with an equal weight of 2-ethylhexyl phthalate, the ratio of the average particle sizes of the two powders being within the range 1:15 to 1:300, and the average particle sizes of the two powders being within the range of from 0.05 micron to 30 microns. Each of the two powders has a narrow particle size distribution, e. g., 95% of the material being within ±0.05 micron of the mean. The two powders are typically mixed in volume ratio within the range of from 75:25 to 25:75. By this procedure it is found that a comparatively readily pourable plastisol may be formed, that is, equal weights of the mixed resin powder and 2-ethylhexyl phthalate form a plastisol having a viscosity of 25,000 centipoises or less at 25° C. e. g., 8,000 to 25,000 centipoises at 25° C.

*Example I*

(A) Polyvinyl chloride was prepared by a conventional emulsion polymerization process according to the following formula:

| | Parts by weight |
|---|---|
| Vinyl chloride | 100 |
| Water | 200 |
| Aerosol AY (Na salt of the diamyl ester of sulfosuccinic acid) | 1.0 |
| Potassium peroxydisulfate | 0.15 |

The closed reaction vessel was flushed with nitrogen before introduction of vinyl chloride. The reaction mixture was agitated for about 16 hours at about 50° C. The conversion was then about 85%, and the vessel was cooled and the unreacted vinyl chloride was flashed off. A sample of the resulting latex was examined under high magnification and the average size of the particles in the latex was estimated to be about 0.17 micron, that is, ninety-five percent of the particles were within ±0.05 micron of the mean size. The latex was flocculated with a 20% NaCl solution at 95° C. and the polymer was separated and dried at 85° C. in air in the usual manner. The intrinsic viscosity of the polymer was 1.15.

(B) A second batch of polyvinyl chloride was prepared by the method used in (A), except that 3.0 parts of Duponol ME (sodium lauryl sulfate) was used as dispersing agent. This resulted in an estimated average size of resin particles in the latex of about 0.07 micron. The particle size distribution was again narrow, ninety-five percent of the particles being within ±0.02 micron of the mean. The intrinsic viscosity of the polymer was 1.15.

Plastisols were made from each of these resin powders individually, and also from a mixture of equal volumes of (A) and (B). Each plastisol contained equal parts by weight of resin powder and 2-ethylhexyl phthalate plasticizer. The viscosity and the three plastisols, as determined by a coni-disc viscometer, was as follows:

| Resin Powder Used | Viscosity (Centipoises at 25° C.) |
|---|---|
| (A) | 46,000 |
| (B) | 48,700 |
| (A)+(B) | 9,940 |

It is seen that the plastisols made from resin powder (A) or (B) alone were highly viscous. However, the plastisol made from the mixture of the two powders of substantially different average particle size according to the manner of the present invention, was surprisingly found to be fluid and was adapted to use in high speed coating of cloth, etc. The same decrease in viscosity was obtained by mixing the plastisol containing resin (A) with the plastisol containing resin (B).

*Example II*

A quantity of polymer (A) of Example I was heated for 30 minutes at 120° C. As a result of this heating the particles sintered together to form a resin powder of substantially larger average particle size, viz., about 25 to 50 microns.

Plastisols were made from polymer (A) alone, sintered polymer (A) alone, and a mixture of equal volumes of polymer (A) and sintered polymer (A). Each plastisol contained equal parts by weight of resin powder and 2-ethylhexyl phthalate. The viscosities were as follows:

| Resin Powder Used | Viscosity (Centipoises at 25° C.) |
|---|---|
| (A) | 46,000 |
| Sintered (A) | 75,000 |
| (A)+Sintered (A) | 13,700 |

It is seen that the viscosity of the plastisol is greatly reduced by mixing the two powders of substantially different particle size.

*Example III*

Polyvinyl chloride in granular or bead form was prepared by a conventional bead polymerization process according to the following formula:

| | Parts by Weight |
|---|---|
| Vinyl chloride | 100 |
| Water | 200 |
| Benzoyl peroxide | 1.0 |
| Na salt of the polymer of maleic acid and styrene (dispersing agent) | 0.5 |

The reaction was carried out in the absence of oxygen under conditions similar to those employed in Example I. The estimated average size of the particles was about 50 to 200 microns. This bead polymer alone produced only a dry, grainy mix when blended with an equal weight of 2-ethylhexyl phthalate. When the bead polymer was mixed with an equal volume of polymer (A) of Example I in the manner of this invention the viscosity of the plastisol containing equal parts by weight of resin powder and 2-ethylhexyl phthalate was only 8,080 centipoises at 25° C.

The plasticizer referred to herein as 2-ethylhexyl phthalate is commonly called "dioctyl phthalate" in the trade.

Having thus described our invention, what we claim and desire to protect by Letters Patent is:

1. A process of forming a plastisol which comprises mixing (A) a thermoplastic resin powder, (B) a second thermoplastic resin powder of particle size substantially different from powder (A), and a plasticizer which will not dissolve said powders readily at ordinary temperatures, whereby a plastisol of substantially decreased viscosity is formed compared to the plastisol of the same plasticizer concentration resulting from mixing only powder (A) with plasticizer and said plasticizer being capable of dissolving said powders at elevated temperature whereby said plastisol is converted to a solid gel on cooling.

2. A process of forming a plastisol which comprises mixing (A) a thermoplastic resin powder of such narrow particle size distribution that it normally forms a viscous, pasty plastisol when mixed with plasticizer, (B) a thermoplastic resin powder of particle size substantially different from powder (A), and a plasticizer which will not dissolve said powders readily at ordinary temperatures, whereby a plastisol of substantially decreased viscosity is formed compared to the plastisol of the same plasticizer concentration resulting from resin powder (A) only and said plasticizer being capable of dissolving said powders at elevated temperature whereby said plastisol is converted to a solid gel on cooling.

3. A process as in claim 2 in which resin powders (A) and (B) are mixed in equal parts by volume.

4. A process as in claim 2 in which the ratio of the average particle size of powder (A) to the average particle size of powder (B) is in the range from 1:1.5 to 1:300.

5. A process as in claim 2 in which the thermoplastic resin is polyvinyl chloride and the plasticizer is 2-ethylhexyl phthalate.

6. A process of forming a plastisol of relatively low viscosity by mixing polyvinyl chloride resin powder with a plasticizer which will not dissolve the resin powder readily at ordinary temperatures, but which will dissolve the resin at elevated temperatures, forming a solid gel on cooling, comprising mixing with such plasticizer (A) a polyvinyl chloride resin powder which normally forms, when mixed with an equal weight of 2-ethylhexyl phthalate, a plastisol having a viscosity of 40,000 to 100,000 centipoises at 25° C. and (B) a polyvinyl chloride resin powder of substantially different particle size from powder (A), and which also normally forms, when mixed with an equal weight of 2-ethylhexyl phthalate, a plastisol having a viscosity of 40,000 to 100,000 centipoises at 25° C., the ratio of the average particle sizes of powder (A) to powder (B) being within the range of 1:1.5 to 1:300, said powders each having an average particle size between 0.05 and 30 microns and said powders being mixed in volumetric proportions within the range of 75:25 to 25:75, said mixed resin powders, when mixed with an equal weight of 2-ethylhexyl phthalate, being capable of forming a plastisol having a viscosity of 8,000 to 25,000 centipoises at 25° C.

ALBERT W. MEYER.
WILLIAM A. HERMONAT.

REFERENCES CITED

The following references are of record in the file of this patent:

FOREIGN PATENTS

| Number | Country | Date |
|---|---|---|
| 113,751 | Australia | Aug. 25, 1941 |
| 609,291 | Great Britain | Sept. 28, 1948 |